Oct. 20, 1936.  P. M. LEWIS ET AL  2,058,161
CONTROL MECHANISM FOR AIRCRAFT
Filed July 1, 1935  2 Sheets-Sheet 1
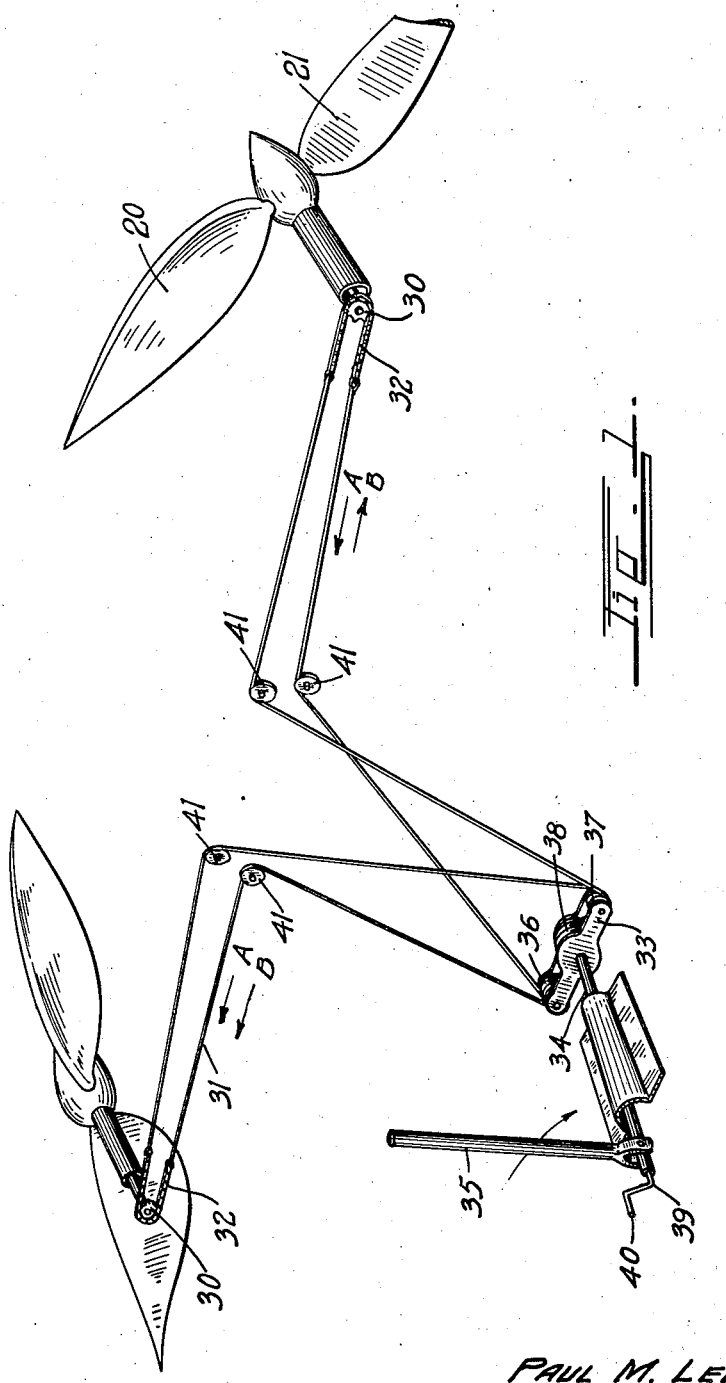
INVENTORS
PAUL M. LEWIS
FRED LANDGRAF
BY
ATTORNEY.

Oct. 20, 1936.   P. M. LEWIS ET AL   2,058,161
CONTROL MECHANISM FOR AIRCRAFT
Filed July 1, 1935   2 Sheets-Sheet 2
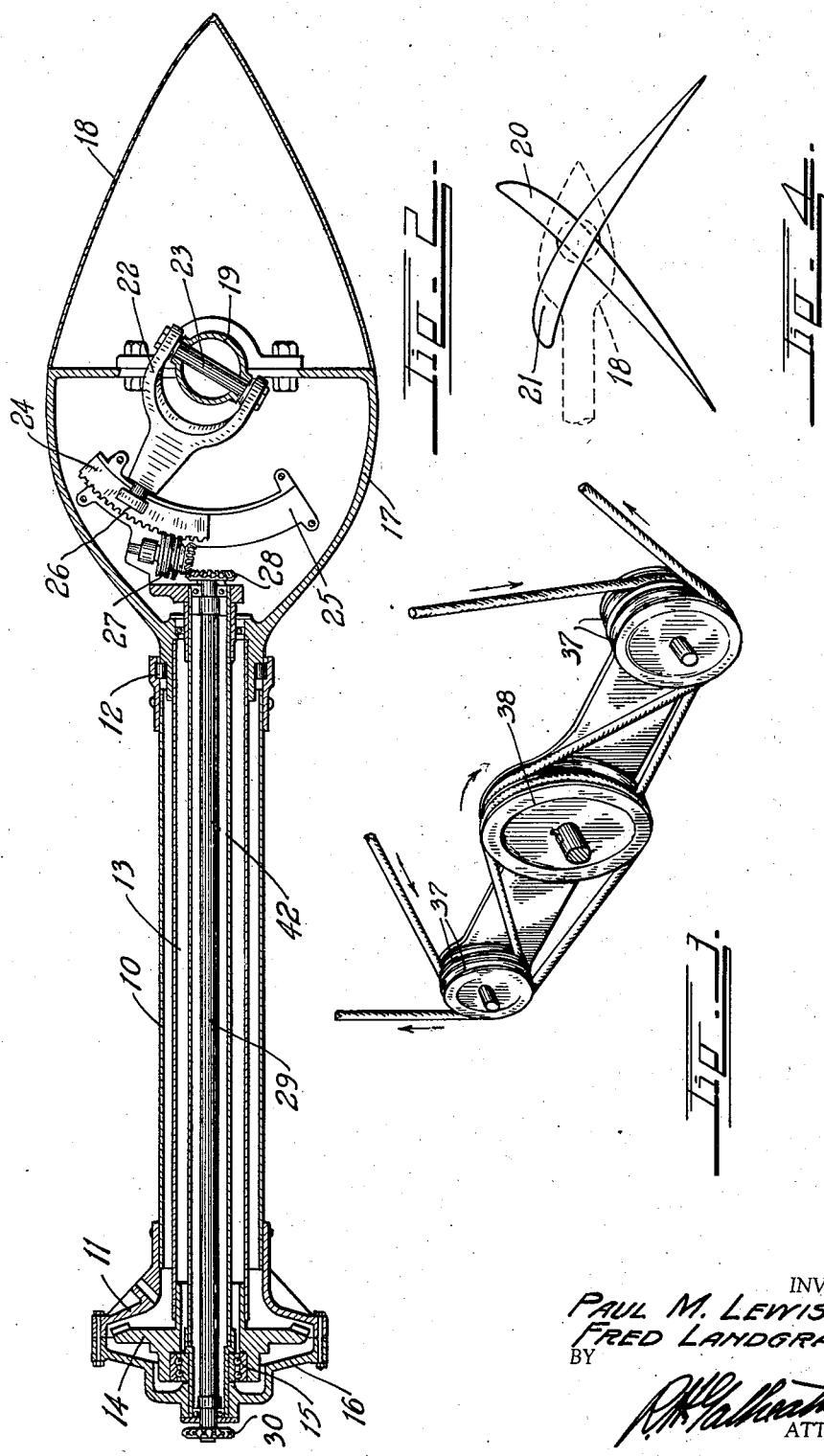
INVENTORS
PAUL M. LEWIS
FRED LANDGRAF
BY
ATTORNEY.

Patented Oct. 20, 1936

2,058,161

UNITED STATES PATENT OFFICE 2,058,161

CONTROL MECHANISM FOR AIRCRAFT

Paul M. Lewis and Fred Landgraf, Denver, Colo., assignors to Lewis-American Airways, Inc., Denver, Colo., a corporation of Colorado Application July 1, 1935, Serial No. 29,301

4 Claims. (Cl. 244—25)

This invention relates to a control mechanism for aircraft having adjustable blade propellers, more particularly of the type illustrated in applicant's copending application Serial No. 66,947.

A propeller of the type illustrated in said copending application can be adjusted so that its entire reaction is either vertical or horizontal as desired. Thus the propeller can be made to exert a straight upward lift on a straight forward traction or any intermediate condition between these extremes. In an aircraft having two or more such propellers it is, of course, necessary to provide control means whereby the effect of the propeller or propellers at opposite sides of center of gravity can be changed similarly and simultaneously so as to maintain the craft in equilibrium through the full range of adjustment of the propellers. The principal object of the invention is to provide such a control means.

It is also desirable to be able to adjust the effect of the propeller or propellers at opposite sides in a direction opposed to each other so that a lifting component can be varied at the opposite sides to level or bank the craft.

Another object of this invention is to provide means whereby the lifting effect of the propeller at one side can be increased while the lifting effect of the opposite propeller is correspondingly decreased so that the craft can be easily and quickly leveled or balanced.

A further object is to combine the means for attaining a similar effect in all propellers with the means for obtaining an opposed effect in opposite propellers, in a single efficient unit which will be simple to operate and positive in action.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a perspective diagrammatic view illustrating the control system applied to two variable pitch and variable effect propellers.

Fig. 2 is a longitudinal section through the shaft of the type of propeller to which the invention is applicable.

Fig. 3 is a detail perspective view illustrating the control head pulleys with the side plate of the control head removed.

Fig. 4 is a detail end view of the propeller blade shaft illustrating the relative blade positions thereon.

As before stated, the control portion of the invention would be applicable to variable pitch propellers of many types. The type for which it was particularly designed, however, is illustrated in the drawings and comprises a stationary shaft housing 10 terminating at one extremity in a gear housing 11 and at its other extremity in a roller bearing 12. Within the housing 10 is a tubular propeller shaft 13 journalled in the bearing 12 and terminating at its rearward extremity in a bevel drive gear 14 or other suitable power transmission device. The rear extremity of the propeller shaft 13 is mounted in a bearing 15 supported from a cover 16 on the gear housing 11.

The forward extremity of the propeller shaft is secured to a hollow propeller hub 17 which may be provided with an air deflecting cone 18. A blade shaft 19 passes diametrically across the hub 17 and is rotatably mounted therein. The extremities of the blade shaft terminate in blades of suitable design 20 and 21. The blades are secured to the shaft 19 in substantially 90° angular relation to each other so that if the blade shaft is turned to place one blade substantially in horizontal plane, the other blade will be substantially vertical therewith. The detail action and operation of the blades is described more in detail in the said copending application, Serial No. 66,947. The entering angle of the blades can be varied by rotating the blade shaft 19 and if this blade shaft is held fixed at a predetermined angle, the blades will always assume the same angle at given points in their rotation.

Thus the blade shaft may be set so that the descending blade exerts substantially 100% vertical lift while the ascending blade "feathers" or rises vertically. Or they may be set as shown in Fig. 1 so that both blades exert a forward tractive effect.

The setting of the blade shaft is determined by the angular placement of an adjusting yoke 22. The furcations of the yoke 22 are journalled on the extremities of a blade shaft pin 23 which passes diametrically through the blade shaft 19 at its point of intersection with the axis of the propeller shaft 13. The yoke 22 is tilted and maintained in the tilted position by means of an arcuate rack 24 which travels in a stationary arcuate guide 25. The rack 24 is provided with an ear 26 connected to a pin in the extremity of the yoke 22.

The rack is reciprocated in its guide 25 by means of a worm 27 driven through the medium of miter gears 28. One of the miter gears 28 is mounted on the extremity of a control shaft 29.

The rack guide 25 is permanently fixed in a vertical position so that the rack will always travel in a vertical plane intersecting the axis of the propeller shaft. This permanent placement of the rack is accomplished by mounting the rack guide on the inner extremity of a stationary tube 42 which surrounds the control shaft 29 and has its outer end secured to the cover 16 which prevents it from rotating.

It can be readily seen that when the control shaft 29 is rotated in one direction it will, through the medium of the worm and rack, tilt the yoke 22 upwardly, and when rotated in the other direction will tilt the yoke downwardly.

The outer extremity of the control shaft 29 terminates in a sprocket wheel 30. In an aircraft having but one propeller, the sprocket wheel could be connected through the medium of a control cable and sprocket chain to any suitable control stick. In Fig. 1, the controls are illustrated for controlling two similar propellers simultaneously. In the latter case, a single endless flexible medium is employed passing over idler pulleys 41 and about the sprockets 30 of both propellers.

The flexible medium preferably consists of a cable 31 in which two relatively short sprocket chains 32 are included at the portions passing the sprockets 30. The cable is operated from a control head 33 fixedly mounted on the extremity of a tubular axle 34. A control stick 35 is pivotally secured to the tubular shaft 34 so that swinging the stick in a lateral arc will serve to tilt the control head 33. The fore and aft swing of the stick may be utilized to control the vertical elevator of the aircraft.

The control head carries a pair of end pulleys 36 and 37, respectively, at its two extremities. At its axis, it carries a pair of middle pulleys 38 which are fixedly mounted upon an adjusting or crank shaft 39 which terminates in a suitable control crank 40.

Let us follow the path of the cable 31 from the top of the sprocket 30 on the "right" propeller. The cable passes from the chain 32 over one of the idler pulleys 41 thence downwardly beneath one of the end pulleys 37, thence around one of the middle pulleys 38 back to the other end pulley 37. From thence, it passes over any necessary idler pulleys 41 to the other chain 32 and about the sprocket 30 on the "left" propeller. From thence, it returns beneath the other end pulley 37 around the other middle pulley 38, back around the other end pulley 36, and over an idler 41 to the chain 32 from whence it started. Therefore it will be seen that the flexible medium is endless.

The stick 35 is for the purpose of leveling or balancing the aircraft. By swinging it in one direction, one of the propellers can be made to exert a greater lifting effect than the other, and vice versa. The crank 40 is for the purpose of adjusting both propellers simultaneously so as to obtain a greater or less lifting effect from both propellers.

Let us assume that the crank 40 is rotated to the right or clock-wise. This will cause it to rotate the middle pulleys 38 clock-wise and in so doing they will draw inwardly on the lower cable of the "right" propeller and outwardly on the lower cable of the "left" propeller, as indicated by the arrows "A". This rotates the control shafts 29 of both propellers in the same direction and the same amount, thus changing the pitch of the blades of both propellers simultaneously.

Let us assume that the control stick 35 is tilted to the "right". This will tilt the entire control head 33 and cause it to move the lower cables to both propellers outwardly, as indicated by the arrows "B", so that the control shaft of one propeller will be rotated in the opposite direction from the control shaft of the other. This causes the propeller blades to be oppositely adjusted so that one will exert more lifting action than before and the other will exert a less lifting action than before. The latter is used for leveling or laterally balancing the aircraft.

In starting a flight, the pilot would turn the crank 40 to the "left" to the extreme left position (which would place both racks 24 at the extreme top of the rack guides. This would give the aircraft a maximum lift on the "take-off". After the desired "ceiling" had been reached, he would rotate the crank 40 to the right to reduce the left to a simple sustaining component and develop a greater head speed. Before landing the crank would again be returned to the lift position to reduce the necessary landing speed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In an aircraft having adjustable pitch propellers with pitch control shafts projecting therefrom, means for simultaneously rotating said shafts either similarly or oppositely as desired comprising: a wheel carried by each of said shafts; a tiltable pulley head; a pair of end pulleys at each extremity of said head; a pair of middle pulleys at the axis of said head; an endless flexible medium trained about said wheels and about all of said pulleys so that when said head is tilted in one direction, it will rotate said control shafts oppositely, and when said middle pulleys alone are rotated they will rotate said control shafts similarly; and means for rotating said middle pulleys.

2. In an aircraft having adjustable pitch propellers with pitch control shafts projecting therefrom, means for simultaneously rotating said shafts either similarly or oppositely as desired comprising: a wheel carried by each of said shafts; a tiltable pulley head; a pair of end pulleys at each extremity of said head; a pair of middle pulleys at the axis of said head; an endless flexible medium trained about said wheels and about all of said pulleys so that when said head is tilted in one direction, it will rotate said control shafts oppositely, and when said middle pulleys alone are rotated they will rotate said control shafts similarly; a control stick for tilting said pulley head; and a control shaft for independently rotating said middle pulleys, said flexible medium being trained from one of said wheels around one of the pulleys of the first end pair, thence around one of the pulleys of the middle pair, thence around the other pulley of the first end pair, thence around the other wheel, thence around one of the pulleys of the second end pair, thence around the other middle pulley, thence around the other pulley of the second end pair back to the first wheel.

3. In an aircraft having two similar, adjustable pitch propellers, means for simultaneously controlling the pitch of said propellers either in the same or in opposite directions as desired comprising: a control shaft projecting from each propeller; a control wheel secured to each control shaft; a tubular axle shaft intermediate said control shafts; a head extending laterally across said tubular axle shaft and secured thereto; a pair of idler pulleys carried at each extremity of said head; an adjusting shaft extending through said tubular axle shaft; a middle pulley mounted on said adjusting shaft between said end pulleys; an endless flexible member extending from the wheel on one control shaft around an end pulley on one extremity of said head, thence around said middle pulley, thence around the other end pulley at the same extremity of said head, thence around the control wheel of the other control shaft, thence returning around an end pulley at the second extremity of said head, thence again around said middle pulley, thence around the other pulley at said second extremity to said first control wheel so that as said head is rocked by rotating said tubular shaft, said control wheels will be rotated in opposite directions; and means for rotating said tubular shaft.

4. In an aircraft having two similar, adjustable pitch propellers, means for simultaneously controlling the pitch of said propellers either in the same or in opposite directions as desired comprising: a control shaft projecting from each propeller; a control wheel secured to each control shaft; a tubular axle shaft intermediate said control shafts; a head extending laterally across said tubular axle shaft and secured thereto; a pair of idler pulleys carried at each extremity of said head; an adjusting shaft extending through said tubular axle shaft; a middle pulley mounted on said adjusting shaft between said end pulleys; an endless flexible member extending from the wheel on one control shaft around an end pulley on one extremity of said head, thence around said middle pulley, thence around the other end pulley at the same extremity of said head, thence around the control wheel of the other control shaft, thence returning around an end pulley at the second extremity of said head, thence again around said middle pulley, thence around the other pulley at said second extremity to said first control wheel so that as said head is rocked by rotating said tubular shaft, said control wheels will be rotated in opposite directions; means for rotating said tubular shaft; and independent means for rotating said middle pulley when desired so as to shift the relative position of said flexible member and rotate said control wheels in a common direction.

FRED LANDGRAF.
PAUL M. LEWIS.